July 5, 1932.  T. L. CORDRAY  1,865,506
AUTOMOBILE SIGNALING DEVICE
Filed July 2, 1930   3 Sheets-Sheet 1
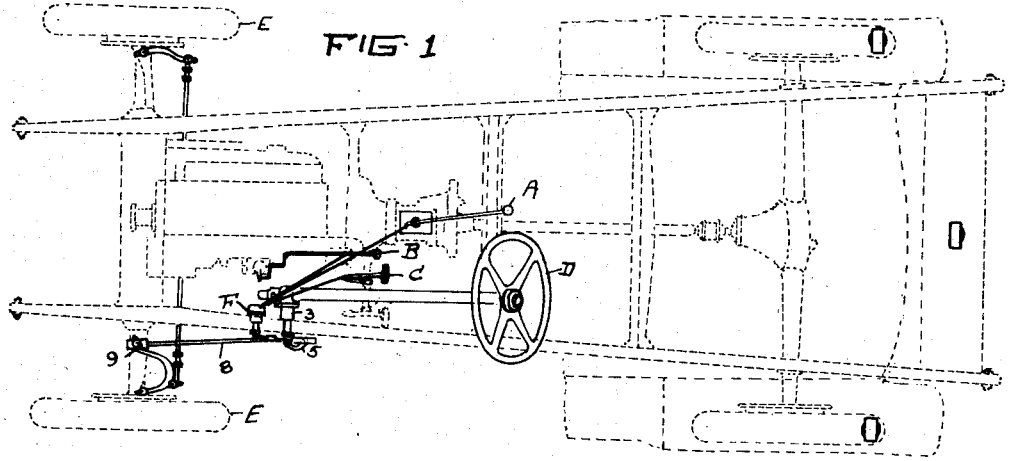
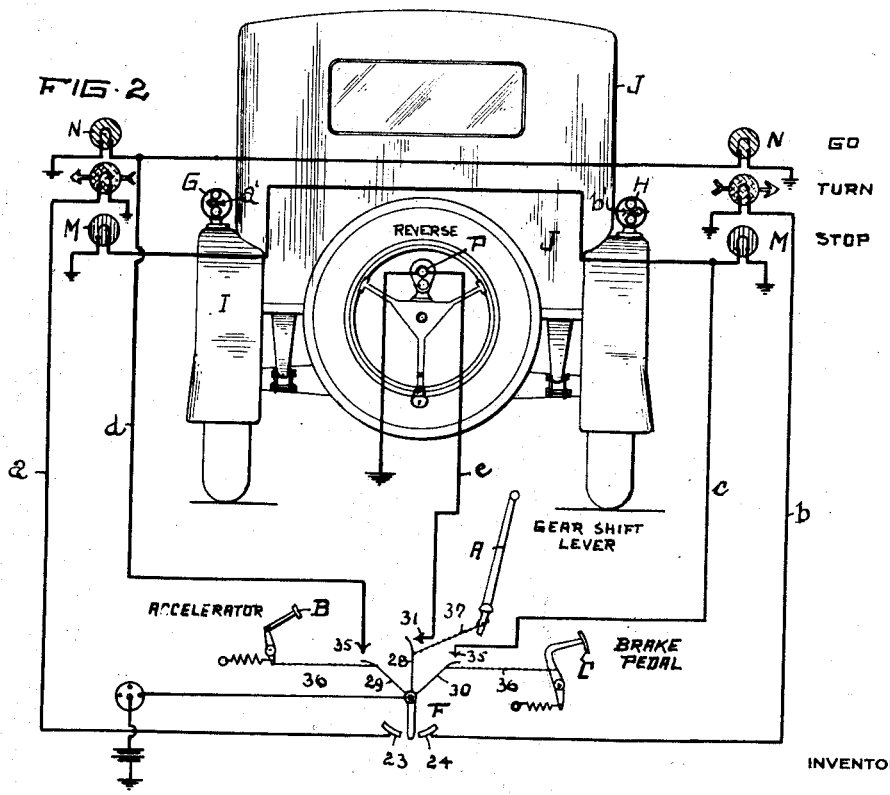
INVENTOR
THORNTON L. CORDRAY
BY
Fisher, Moser + Moore.
ATTORNEY July 5, 1932.                T. L. CORDRAY                1,865,506
                         AUTOMOBILE SIGNALING DEVICE
                      Filed July 2, 1930      3 Sheets-Sheet  2
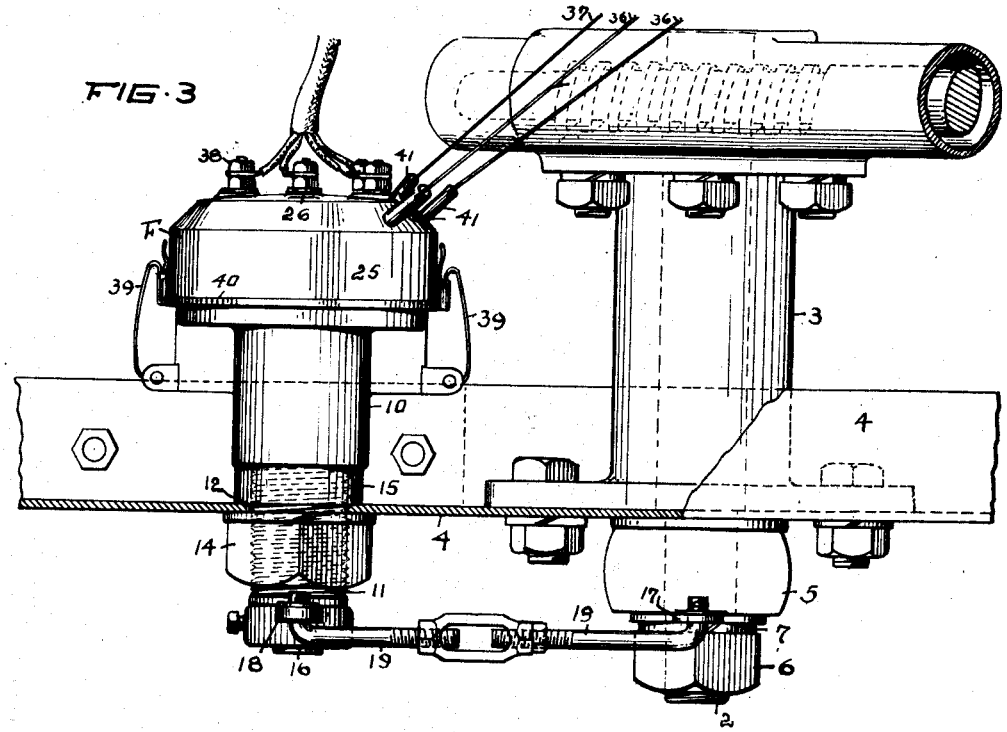
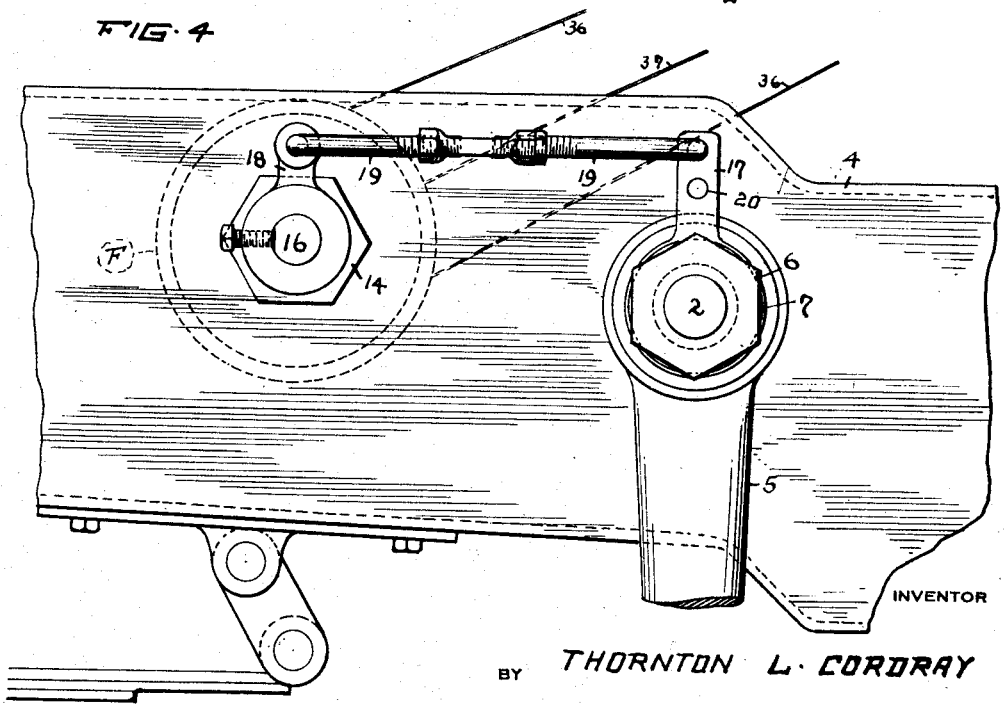
INVENTOR
BY   THORNTON L. CORDRAY
Fisher, Moser & Moore
ATTORNEY July 5, 1932.　　　T. L. CORDRAY　　　1,865,506
AUTOMOBILE SIGNALING DEVICE
Filed July 2, 1930　　　3 Sheets-Sheet 3
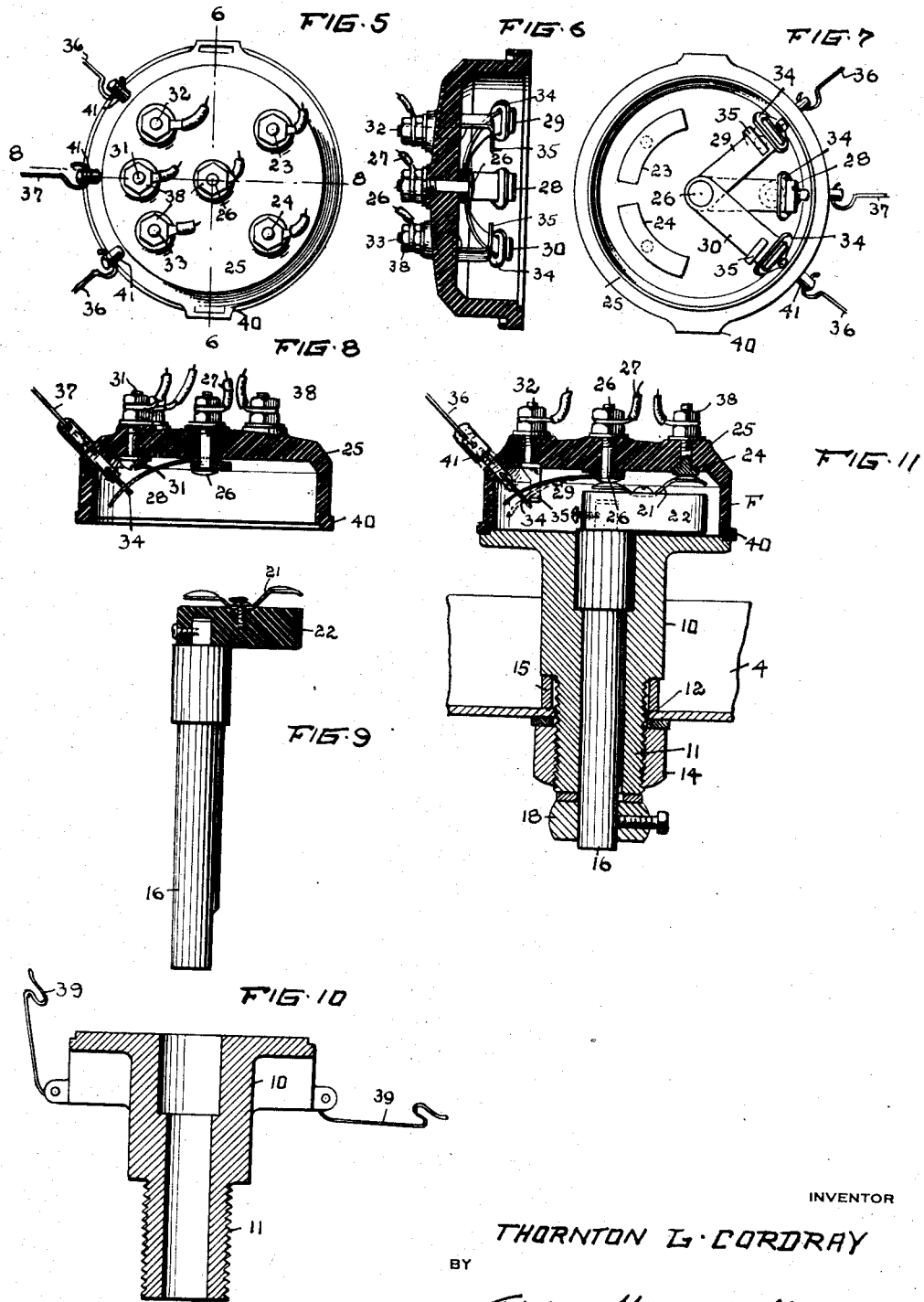
INVENTOR
THORNTON L. CORDRAY
BY
Fisher, Moser + Moore
ATTORNEY Patented July 5, 1932

1,865,506

UNITED STATES PATENT OFFICE

THORNTON L. CORDRAY, OF CLEVELAND, OHIO

AUTOMOBILE SIGNALING DEVICE

Application filed July 2, 1930. Serial No. 465,390.

My invention relates to automobile signaling systems, and my object in general is to provide automatic means for producing visible signals as a warning to others of the movements of an automobile, including a stop signal, an accelerator signal, left and right turn signals, and a reverse or backing-up signal. To foster the general object I provide a simple electrical controller which may be readily attached to the automobile frame and conveniently connected to the steering mechanism, the brake operating devices, the gear shifting means and the accelerator.

Thus, this electrical controller is particularly constructed to be fastened upon one of the side members of an automobile chassis frame in close proximity to the steering mechanism with one end operatively connected to such mechanism and its opposite end operatively connected to several other manually-operable controlling devices in the front part of the vehicle. The position and working relation of the controller to the steering mechanism and other operating devices is also such that the controller and its connections may be readily installed in practically any make or standard type of automobile, and a detachable head forms part of the controller to facilitate the making of a series of mechanical and electrical connections and to permit convenient inspection, tests and repairs.

In the accompanying drawings, Fig. 1 is a diagrammatical view of an automobile embodying my improvements in signaling devices, and Fig. 2 is a diagrammatic view of an electrical circuit containing my improvements, and a rear view of an automobile equipped with a set of signaling lamps connected in said circuit. Fig. 3 is an enlarged plan view of a part of the steering mechanism and frame of an automobile, including my improved signal controller, and Fig. 4 is a side elevation of the same parts. Fig. 5 is an outside view of the controller cap or head, Fig. 6 a sectional view thereof on line 6—6 of Fig. 5, and Fig. 7 an inside view of the same part or member. Fig. 8 is a sectional view of the cap or head on line 8—8 of Fig. 6. Fig. 9 is a side and sectional view of the oscillatory shaft and contact member carried thereby. Fig. 10 is a sectional view of the controller body within which the shaft has rotatable bearing and to which shaft has rotatable bearing and to which the cap or head may be detachably connected. Fig. 11 is a sectional view of the controller parts assembled and fixed to a portion of the chassis frame.

It is known that automobiles in general use are provided with various controlling devices, including a gear shift lever A adapted to be operated by hand, a foot-operated member B called an accelerator for controlling the speed of the engine, a foot pedal C for controlling the wheel brakes, and a steering wheel D which is mounted upon a steering column and connected to the front wheels E of the vehicle to control its course of movement, substantially as shown and exemplified in Fig. 1. The steering connections usually include a short cross shaft 2 which is geared to the steering wheel spindle at the base of the steering column, as well known. Shaft 2 has rotatable bearing in a supporting bracket 3 bolted to one channeled side member 4 of the chassis frame, and one end of this shaft extends through said side member and carries a lever 5 fixed thereto by a screw nut 6 and lock washer 7. A rod or link 8 connects lever 5 with the steering knuckle 9 of one of the vehicle wheels, thus completing the operating connection with the steering wheel D within the car. Cross shaft 2 is oscillated only in guiding the car, thereby permitting this shaft and its oscillating movements to be utilized for signaling purposes, as follows:

Thus, I provide a small compactly-built electrical controller or switching device F having an elongated body 10 terminating in a reduced screw-threaded portion 11 adapted to project through an opening 12 in chassis frame 4, thereby permitting a screw-nut 14 and a locking washer to be used to attach this body rigidly to the inside of the frame in close proximity to and parallel with cross shaft 2. A spacing collar 15 may also be used to determine the exact position of body 10 in respect to the frame or the outer end of oscillatory shaft 2 so that a free working connection may be obtained between this shaft and a second shaft 16 extending through an axial bore in body 10. The connecting parts between these two shafts comprise two short arms 17 and 18, respectively, and a link 19. Arm 17 is a relatively thin flat steel piece having an opening adapted to sleeve over the reduced end of shaft 2 when nut 6 is first removed. Upon replacing the nut the arm 17 may be clamped tightly between lock washer 7 and the hub of steering lever 5, see Fig. 3. Two or more perforations 20 are provided in arm 17 to permit link 19 to be coupled thereto adjustably, and the link itself may be of the turn-buckle type to permit it to be extended or contracted in length for adjustment purposes. Arm 18 is secured in any suitable way to the projecting end of the short shaft 16 within body 10, see Fig. 1, and the opposite inner end of shaft 16 carries a switch member consisting of a bowed spring or contact strip 21 fixed to a piece of insulating material 22. Accordingly, when the steering wheel D is operated the bowed spring or switch member 21 is caused to turn either to the right or left in respect to a neutral position, and in so doing come into contact with one or the other of a pair of contact segments 23 and 24, respectively, mounted within a chambered cap or head piece 25 which is detachably connected to the enlarged or flanged end of body 10. In that way two separate electric circuits may be controlled to illuminate separate electric lamps mounted upon some portion of the vehicle, and as an exemplification see the electrical diagram, Fig. 2, wherein the two separate circuits are represented by $a$ and $b$, respectively, and the two arrows $a'$ and $b'$ respectively, in the two lamp bodies G and H on the fenders I of the car J represent two independent electric lamps adapted to be illuminated alternately when their respective circuits are closed alternately by the reverse turning movements of the steering wheel. Thus should the operator steer the car to the left, such movement will be signaled or indicated by illuminating the arrow $a'$ in lamp body G, and if the car is turned to the right this movement will be signaled or indicated by the illumination of arrow $b'$ in lamp body H. When the car is traveling a straight course ahead the switch member is in a neutral position and neither lamp is illuminated.

Now, returning to controller F, the contact spring or switch member 21 therein has one end thereof extending over the axis of the controller shaft so that it may have constant rotatable contact with a metal stud or electrical terminal 26 fixed centrally within the chambered cap or head piece 25. Terminal 26 is connected by a flexible conductor 27 to the source of electric current for the lighting or ignition circuit of the automobile so that the direction signal lamps $a'$ and $b'$ may be illuminated automatically when the steering wheel is rotated sufficiently to turn the vehicle in either direction, and further so that other electric circuits may be opened and closed, to produce other signals automatically, especially a stop signal, a backing or reverse movement signal, and a speed signal, all through the signal controller F. Thus, the cap or head piece 25 of the controller is provided within its interior with three spring contact blades 28, 29, and 30, respectively, in addition to the contact segments 23 and 24. These spring blades are radially disposed within the chambered cap and secured at their corresponding inner ends to the central stud or terminal 26, which as stated heretofore is connected to a source of electric current. The flexible outer ends of these blades are located opposite contact terminals or posts 31, 32, and 33, respectively, fixed upon the end wall of the cap, and a slidable keeper or yoke 34 is connected loosely to the flexible end of each blade to control its position in respect to its co-operating contact terminal or post. Normally, blade 28 springs apart or away from the contact terminal 31, and its keeper 34 must be pulled down or drawn outwardly to cause the blade to engage the head of the terminal to close the electric circuit of which it forms a part. On the other hand the other two spring blades 29 and 30, respectively, are normally held under tension by their respective keepers 34 and restrained from coming into engagement with their co-acting terminal posts 32 and 33 which have bent extremities 35 adapted to overlap the blades for contact purposes. That is, the slidable keepers 34 for the spring blades 32 and 33 are normally under a pulling strain and drawn outwardly to keep these blades out of engagement with the bent extremities 35 of terminal posts 32 and 33, inasmuch as the keepers for these particular spring blades are connected by pull chains or wires 36 leading to the brake pedal C and the speed controlling device or accelerator B, respectively, of the automobile, as indicated diagrammatically in Figs. 1 and 2.

It should be also understood that the brake pedal C and accelerator device B are each controlled by strong springs which return them to a normal rest position when the operator of the vehicle removes his foot therefrom or fully relieves the pressure thereon, and that these strong springs offset the weaker pull of the spring blades in controller F until the operator actuates either the brake pedal or the accelerator. Should he operate the brake pedal C a warning signal will be given instantly by a stop light or lamp M, or two such lamps connected in parallel in a circuit $c$, of which spring blade 30 forms a part, and should the accelerator device B be depressed or operated in a predetermined degree then another lamp or pair of lamps N will be illuminated instantly in a separate electric circuit d controlled by spring blade 29. Thus, when the vehicle is in motion and the engine running at a given speed as determined by the operator at the accelerator device, a constant speed signal will be maintained at the lamps N. Consequently, when the operator cuts off the gas by releasing the accelerator with the idea of slacking the speed of the engine and car, the speed signal light will be switched off instantly by the outward pull on spring blade 29, thereby giving immediate warning of the change in speed about to occur. Then should the brakes be applied the stop signal lights will be switched on, inasmuch as the depression of the brake pedal permits the spring blade 30 to close circuit c.

The keeper 34 for the spring blade 28 in the controller is connected by a flexible chain or wire 37 to the gear shift lever A for the automobile, which in one of its shiftable positions controls the reversing or backing movements of the car. Generally, the gear-shift lever is thrust forwardly to effect reverse movements of the car, and by connecting the wire 37 with a slight play to the shorter end of the lever below its fulcrum a short pull may be transmitted to the wire when the lever is shifted into its reversing position, and in no other position. Only a slight pulling movement on wire 37 is required to draw the spring blade 28 into contact with terminal 31 to close a third electric circuit e containing a signal lamp P which may be mounted upon the rear of the vehicle, preferably centrally thereof, or in association with a tail light or one of the other lamps herein described.

All the lamps are grounded, and the live wire in the main circuit is connected to the central stud or terminal 26 in the removable controller cap or head 25, which cap also carries the positive terminal for the respective circuits a, b, c, d, and e, each circuit including a flexible conductor adapted to be attached to the terminal by nuts 38 upon the outside of the controller cap. Accordingly, the cap may be readily detached from the body of the controller for inspection and repairs, and to facilitate quick detachment and attachment of the cap, a pair of spring snap locks or clamping members 39 may be pivoted to the controller body for releasable engagement with a beaded or notched rim 40 on the cap. The respective keeper connections for the spring blades within the cap are also preferably provided with round perforated stems 41 arranged to extend and slide at a diverging angle in respect to the circular rim or periphery of the cap so that the operating wires connected therewith may be projected on diverging and substantially straight lines to the gear shift lever, the accelerator, and the brake pedal, within the car. The attachment of the controller to the frame at or near the base of the steering column also makes it convenient to connect the controlling wires in the way and to the parts herein described, as well as to simplify the making of a working connection between the steering mechanism and the controller shaft. Disassembly and repairs of parts at the base of the steering mechanism may also be made without having the near presence of the controller interfere because the cap may be readily detached from the controller body and laid aside without disconnecting any of the wires attached to the terminals. Thus, when the cap is detached, the space adjacent the steering column parts is not obstructed and the cap and switch parts are also conveniently accessible.

The controler, as constructed, is in itself a complete operative unit and an article of manufacture and sale, which may be easily installed in standard makes of automobiles, together with the signaling circuits for which it is primarily designed.

What I claim, is:

1. As a separate article of manufacture and sale for automobiles, an electrical signaling controller, having means for attaching it to a fixed part of an automobile, means for making and breaking a plural number of electrical circuits, said last mentioned means including a plurality of radially disposed flexible blades and keepers therefor, and a series of flexible operating elements extending obliquely therefrom adapted to be connected to several of the devices in the automobile for controlling the operations thereof.

2. An attachment for an automobile, comprising an electrical signaling controller having means for securing it to a fixed part of an automobile and including a detachable cap, a plurality of switches covered by said cap, said switches including a plurality of flexible blades and keepers therefor, said keepers being slidable radially through said cap, and independent operating connections for said keepers extending outwardly in different directions from said controller.

3. An attachment for an automobile, comprising a body member, a shaft extending through and pivotally supported in said body member, a switch member secured to one end of said shaft, a detachable cap for said body member, a central terminal in said cap contacting with said switch member, a pair of segmental contacts in said cap co-operating with said switch member, a series of flexible switch members attached to said cap and radially extending from said central terminal, and operating means for said flexible switch members extending radially through the wall of said cap.

4. An attachment for an automobile comprising a body member, a shaft pivotally mounted in said body member, a switch member secured to one end of said shaft, a detachable cap for said body member, a central terminal in said cap contacting with said switch member, a pair of segmental contacts in said cap co-operating with said switch member, a series of flexible contact members attached to said central terminal and radially extending therefrom, a series of contacts co-operating with said contact members, and adjustable operating means for said contact members extending radially through the wall of said cap, one of said contact members tending by its inherent tension to disengage its co-operating contact and the other contact members tending by their inherent tension to approach their corresponding contact members.

5. An attachment for an automobile according to claim 4 having adjustable operating means for the contact members.

6. A signal controlling device for an automobile, comprising a body member containing an oscillatory shaft having a contact member secured thereto, a detachable cap for said body member having a set of contacts radially thereof adapted to be engaged alternatively by said contact member, said cap also having a set of flexible switch members secured thereto, keepers for normally maintaining certain of said switch members under tension and in inoperative position, and operating means for said keepers extending outwardly through the wall of said cap.

7. A signal controlling device for an automobile, comprising a body member containing an oscillatory shaft, having a contact member secured thereto, a set of segmental contacts radially within said body member adapted to be engaged alternatively by said contact member, a flexible switch member within said body member fed by said contact member, a keeper slidably connected to said switch member and operating means for said keeper extending outwardly through the wall of said body member.

8. An attachment for an automobile, comprising a body member, a shaft extending through and pivotally supported in said body member, a switch member secured to one end of said shaft, a detachable cap for said body member, a central terminal in said cap contacting with said switch member, a pair of spaced segmental contacts in said cap co-operating with said switch member, a flexible switch member attached to said cap fed from said central terminal and operating means for said flexible switch member extending radially through the wall of said cap.

In testimony whereof I affix my signature.

THORNTON L. CORDRAY.